US011986837B2

(12) United States Patent
Valerio

(10) Patent No.: US 11,986,837 B2
(45) Date of Patent: May 21, 2024

(54) SYSTEM AND METHOD FOR RECOVERING METAL FROM ASH

(71) Applicant: Thomas A. Valerio, Atlanta, GA (US)

(72) Inventor: Thomas A. Valerio, Atlanta, GA (US)

( * ) Notice: Subject to any disclaimer, the term of this patent is extended or adjusted under 35 U.S.C. 154(b) by 114 days.

(21) Appl. No.: 17/473,801

(22) Filed: Sep. 13, 2021

(65) Prior Publication Data

US 2022/0097079 A1 Mar. 31, 2022

Related U.S. Application Data

(63) Continuation of application No. PCT/US2020/022813, filed on Mar. 13, 2020.

(60) Provisional application No. 62/818,095, filed on Mar. 13, 2019.

(51) Int. Cl.
*B03B 9/04* (2006.01)
*B03C 1/023* (2006.01)
*B03C 1/247* (2006.01)

(52) U.S. Cl.
CPC ................ *B03B 9/04* (2013.01); *B03C 1/023* (2013.01); *B03C 1/247* (2013.01); *B03C 2201/20* (2013.01)

(58) Field of Classification Search
CPC ......... B07B 15/00; B03C 1/023; B03C 1/247; B03C 2201/20; B03B 9/04
See application file for complete search history.

(56) References Cited

U.S. PATENT DOCUMENTS

| | | | | |
|---|---|---|---|---|
| 3,806,046 | A * | 4/1974 | Kouloheris | B03D 1/021 241/24.12 |
| 3,997,359 | A * | 12/1976 | Dankoff | B03B 5/28 209/214 |
| 5,992,776 | A | 11/1999 | Arcaini et al. | |
| 6,132,355 | A | 10/2000 | Derie | |
| 6,666,335 | B1 | 12/2003 | Bradley et al. | |
| 2011/0121112 | A1 | 5/2011 | Alford | |
| 2012/0018548 | A1 | 1/2012 | Andela | |
| 2013/0181075 | A1 | 7/2013 | Pickens et al. | |
| 2013/0313167 | A1 | 11/2013 | Vandemierden | |
| 2017/0157620 | A1* | 6/2017 | Vandemierden | B03B 7/00 |
| 2018/0214890 | A1 | 8/2018 | Valerio | |
| 2018/0272356 | A1 | 9/2018 | Valerio | |

OTHER PUBLICATIONS

International Search Report, dated May 26, 2020, from corresponding International Application No. PCT/US2020/022813.
Written Opinion of the International Searching Authority, dated May 26, 2020, from corresponding International Application No. PCT/US2020/022813.

* cited by examiner

*Primary Examiner* — Michael Mccullough
*Assistant Examiner* — Kalyanavenkateshware Kumar
(74) *Attorney, Agent, or Firm* — Greenberg Traurig, LLP; Nigamnarayan Acharya

(57) ABSTRACT

A system for recovering of metal and sand from incinerator ash material having an ash clarification assembly, a magnet to remove the ferrous from the heavy material; a sorting assembly, a drying cage or dewatering unit to dry the material; and a separation assembly to remove the aluminium from the material. Methods are included as well.

10 Claims, 4 Drawing Sheets

SYSTEM AND METHOD FOR RECOVERING METAL FROM ASH

TECHNICAL FIELD

This application relates to metal recovery systems and separation techniques. More specifically, this application relates to method and systems for recovering of ferrous and nonferrous elements from the burned solid wastes of ash (e.g., incinerator ash) and producing a clean aggregate and clean sand.

BACKGROUND

Millions of tons of municipal solid waste are produced every year. Waste management and utilization strategies are major concerns in many countries. Incineration is a common technique for treating waste, as it can reduce waste mass by 80% and volume by up to 90% and can allow recovery of energy from waste to generate electricity.

To use the incinerator waste and reduce the environmental impact, treatment methods have been introduced and the waste has been classified and separated to promote recovery. There is always a need for improved methods for separating and classifying incinerator waste, including incinerator combined ash (a mixture of fly ash and bottom ash). Generally, companies in the US combine fly ash and bottom ash, whereas companies in the EU tend to keep them separate.

Accordingly, there is always a need for improved methods and systems for separating incinerator waste, including ash. It is to this need among others that this application is directed.

SUMMARY

This application discloses systems and methods for recovering metals like ferrous and nonferrous waste. This application includes the separation of metals and nonmetals. One embodiment includes the recovery of ferrous element from incinerator ash. One aspect of this invention provides a system and method to recover metal and sand from incinerator ash. Another aspect provides a system and method to separate ferrous and non-ferrous elements.

One embodiment includes a system for recovering of metal from incinerator ash comprising, an infeed hopper to hold the incinerator ash, an ash clarification assembly or first density separator attached to the infeed hopper for separating light and heavy ash, a rotary magnet coupled to the ash clarification assembly to separate un-burn ferrous and non-ferrous elements present in the incinerator ash, a sorting assembly or second density separator associated with the rotary magnet to refine the incinerator ash, a cleaning assembly connected to the sorting assembly for scrubbing and washing of the ferrous and nonferrous elements, a drying cage attached to the cleaning assembly to dry the ferrous and non-ferrous elements and a separation assembly connected to the drying cage for segregating the ferrous and nonferrous elements.

Another embodiment is a system for recovering of metal and sand from incinerator ash material having an infeed hopper to hold the incinerator ash material; an ash clarification assembly in connection with infeed hopper for separating light and heavy ash, wherein the ash clarification assembly separates materials by specific gravity and separates un-burned organics and light ash from heavy ash material; a magnet to remove the ferrous from the heavy material; a sorting assembly or second density separator to remove heavy metals from the material capable of sorting material at 1.6 to 1.8 specific gravity; a drying cage/dewatering to dry the material; and a separation assembly to remove the aluminum from the material, which remaining material, wherein the remaining material can be sand.

In one embodiment, the ash clarification system can be a jig, a sand screw, a sink-float separator, and an airtable separator, or a rising current separator. A cleaning assembly in operative connected to the sorting assembly for scrubbing and washing of sand from the material. A plurality of conveyer belts can be used for moving said incinerator ash in said system. The incinerator ash can mixture of bottom ash and fly ash. The separation assembly can be an electrostatic separator or ball mill or a rod mill.

One embodiment includes a method hold the incinerator ash through the infeed hopper, separating heavy and light ash by using the ash clarification assembly, separating the ferrous and non-ferrous elements using a rotary magnet, refining the incinerator ash by using the sorting assembly, scrubbing and washing the ferrous and nonferrous elements using a cleaning assembly, drying the ferrous and nonferrous elements by using the drying cage.

While the invention has been described and shown with particular reference to the preferred embodiment, it will be apparent that variations might be possible that would fall within the scope of the present invention.

BRIEF DESCRIPTION OF THE DRAWINGS

This disclosure is illustrated in the figures of the accompanying drawings which are meant to be illustrative and not limiting, in which like references are intended to refer to like or corresponding parts, and in which.

DETAILED DESCRIPTION

Generally, this application relates to systems and methods for recovering desired materials from incinerator ash, including but not limited to, incinerator combined ash. The systems and methods may include screen(s), density separator(s)/jig(s), magnetic pulley(s)/magnet(s), sand washer(s), eddy current separator(s), and other sorters. The systems and methods can be high throughput methods and can process more than 30 tons of material per hour.

Figure 1:
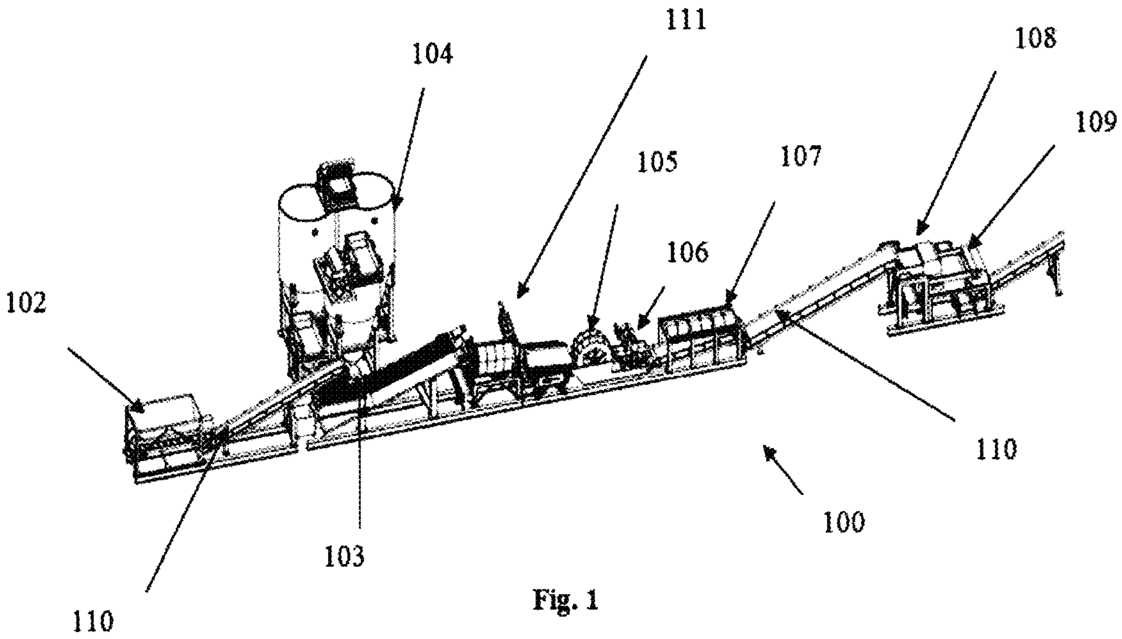
FIG. 1 is a schematic view of the system for recovering metals and sand from incinerator ash.

Referring to FIG. 1, one embodiment of the system 100 for recovering metal and sand from incinerator ash or processed ash includes an infeed hopper 102 is installed in the system 100 to hold ash. The ash can be held by the infeed hopper 102. The incinerator ash is the combination of bottom ash and fly ash. The infeed hopper 102 can be an upper side open trapezoidal structure. The size of incinerator ash particles can be sized to, e.g., around 2 mm to 6 mm, by traditional sizing devices.

From the infeed hopper 102 or in operative connection, there can be an ash clarification assembly 104 or a first density separator. The ash clarification assembly 104 is used for separation of light and heavy ash particles. The heavy and light ash particles are generally metallic and nonmetallic elements. The ash clarification assembly 104 used to remove corrosive, reactive and polymerisable component from the incinerator ash. An ash clarification assembly can separate the material at about 1 or between 1 and 1.2 or 1.1. and 2. The unburnt organic material (e.g., light organics, ash, unburnt waste, and waste) and the light ash material are separated from the heavy ash material.

A magnet 103 can be operatively connected or downstream thereof to the ash clarification assembly 104, which removes the light ash or organics. The rotary magnet 103 also known as wet magnet. A conveyer can be used for transferring the ash from the infeed hopper 102 to the density separator 103, similarly multiple conveyer are used to transfer the ash to other parts of the system. A density separator 101 separates the materials by relative density or specific gravity, which removes the heavier material for further processing. Some unburnt ferrous material and nonferrous elements present in the incinerator ash may be larger than 6 mm. The rotary magnet or magnet after the density separator can be used to separate the un-burnt ferrous material and the nonferrous material of incinerator ash. The rotary magnet 103 can be cylindrical in shape and/or very powerful to attract the ferrous elements. The rotary magnet 103 separates the ferrous elements from nonferrous elements and ash particles. After separation the un-burn ferrous elements are collected in containers through a sieve screen aperture.

A sorting assembly 111 or second density separator can be associated with the rotary magnet 103 for refining of the incinerator ash. A sorter assembly should be able to remove or separate aluminum from the material. The sorting assembly can be a water jet technology, rinsing technology, screening, or other technology. After passing the ash through the ash clarification assembly 104 the incinerator ash left with only heavy particles. These particles may contain the ferrous and nonferrous elements. The particles are large in size. The refining process changes the texture of the particles, as they become ultrafine that helps in extracting the ferrous and nonferrous from them. The sorting assembly or second density separator to remove heavy metals from the material capable of sorting material at 1.6 to 1.8 specific gravity. This step or element removes the nonferrous heavy metals.

A cleaning assembly 105, 106 can be connected to the sand sorting assembly 111 for scrubbing and washing the ultrafine particles to extract the ferrous and nonferrous elements. Firstly, these particles are scrubbed by sand scrubber 105 to remove the inorganic particles that may attached with the ferrous and nonferrous elements present in the incinerator ash. The sand scrubber 105 can be basically a wide rotating wheel with multiple pockets for holding sand particles to scrub the incinerator ash. After passing through the sand scrubber 105, the ash particles split into ferrous and nonferrous elements. The sand particles may stick to the ferrous and nonferrous elements. To remove the sand particles, a washing jet 106 can be used.

The sieve screen aperture may be interconnected in between magnet 103 and the conveyor 110. The sieve screen aperture can be a barrier made up of crisscross connection of very thin wires. These wires are made of fiber. Due to fiber material the sieve screen aperture becomes flexible and ductile in nature. The sieve screen aperture consists of tiny pours. These tiny pores are of size less than 2 mm that may use to separate the minute ash particles from the incinerator ash that are smaller than 2 mm. Generally these particles are organic in nature.

.A drying cage 107 can be attached to the cleaning assembly 105, 106 to parch the nonferrous elements. The drying cage 107 may consist of multiple high-power halogens for generating heat by increasing the temperature of the cage to vaporize the water from the ferrous and nonferrous elements.

After de-watering and drying, a separation assembly 108, 109 or an eddy current can be connected to the drying cage 107 for segregating the aluminum and non-aluminum elements. To separate the aluminum and non-aluminum elements. This separation assembly 108, 109 consists of a magnetic chamber 108 that has a high-power electromagnet to attract the ferrous elements and an eddy current chamber 109 can be used to separate the nonferrous elements.

The eddy current can be induced by changing in magnetic field and it flow in closed loops. The eddy current can be perpendicular to a plane of the magnetic field. The eddy current can be created upon moving a conductor through a magnetic field and due to this a change can be experienced in intensity or direction of the magnetic field that may produce eddy current.

A falling velocity or density separator may optionally be placed underneath of the conveyer 110 for sorting of organic material from incinerator ash that can be left after the sieve screen aperture. The density separator used to separate heavy and light particles from the incinerator ash. The ash particles of size 2 mm to 6 mm are separated by density of elements present in the ash. The falling velocity separator operates on specific gravity and include jigs The specific gravity is known as relative density. This relative density is ratio of measured substance density and density of the reference. The incinerator ash is penetrated on an oscillating fluid bed that may support on the sieve screen aperture. The falling velocity separator operates on specific gravity ("SG") about 1 to 1.8. The elements that are less than 1.8 are inorganic. These elements may separate from the incinerator ash, whereas the elements that are more than 1.8 are considered as ferrous and nonferrous.

The light and heavy ash particles are collected in a density separator, e.g., a falling velocity separator (FVS) overflow. After collecting the ash particles, the FVS takes the ash particles to the ash clarification assembly 104. The light and heavy ash particles are of size 15-100 micron that may contain metal and nonmetal elements. To separate the metal and nonmetal elements from the incinerator ash, the ash clarification assembly 104 can be used. The ash clarification assembly 104 contains clean water, the particles that are larger than 15 micron may go to underflow and the particles that are smaller or equal to 15 micron moves to overflow. The nonmetal ash particles also go to the overflow. A crust formed on top of the ash clarification assembly 104 contains nonmetal of less than 15 micron. The overflow can be clean water that may recycle into the ash clarification assembly 104. The working of ash clarification assembly 104 can be based on buoyancy fluid method.

The Buoyancy is force that causes objects to float. The force exerted on an object that is partly or wholly immersed in a fluid. Buoyancy is cause by differences in pressure acting on opposite sides of an object immersed in a static fluid. It is also known as the buoyant force. Buoyancy is the phenomena due to buoyant force. An object is immersed in a liquid may experience an upward force that is known as buoyant force. An upward force exerted by the fluid that opposes a weight of an object immersed in the fluid. A pressure in the fluid column increases with depth. The pressure at the bottom of an object submerged in the fluid is greater than the force on the top. The difference in this pressure results in a net upward force on the object that define as buoyancy.

Figure 2:
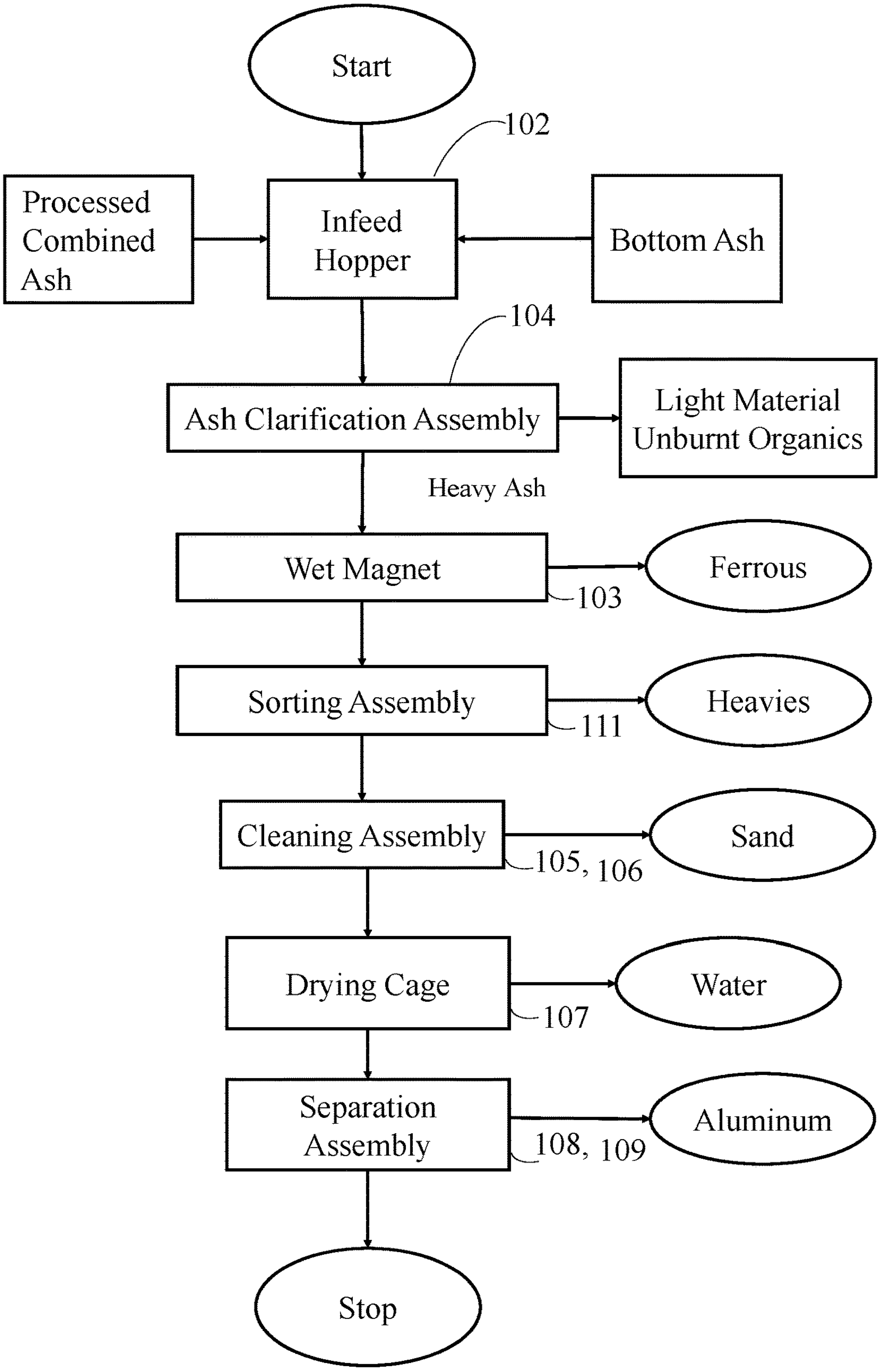
FIG. 2 is a process flow diagram illustrating a method of incinerator combined ash processing according to the embodiment shown in FIG. 1.

FIG. 2 shows an exemplary flow of material through an exemplary system using the components identified in FIG. 1. The materials enter from a hopper 102, which then flow to a density separator and clarification assembly 104. At that point, the light materials are removed from the material and the material (containing iron or ferrous) is the processed by a wet magnet or rotary magnet. The material, which is generally ferrous free, can be passed to the sand sorting assembly 111, from which sand may be collected and distributed or sold. A hydro cyclone can be used for eliminate sand particles. The washing jet 106 may consist of a dewatering screen for draining the water for collecting in a return box. The water collected in the return box can be filtered for reuse. A high-pressure pump can be connected to the washing jet 106 to release the water in high speed.

A drying cage 107 can be attached to the cleaning assembly 105, 106 to parch the material, which contains aluminum. The drying cage 107 may consist of multiple high-power halogens for generating heat by increasing the temperature of the cage to vaporize the water from the aluminum and non-aluminum elements.

A separation assembly 108, 109 can be connected to the drying cage 107 for segregating the aluminum and nonaluminum elements. To separate the aluminum and non-aluminum elements. This separation assembly 108, 109 consists of a magnetic chamber 108 that has a high-power electromagnet to attract the aluminum elements and an eddy current chamber 109 can be used to separate the nonaluminum elements.

The eddy current can be induced by changing in magnetic field and it flow in closed loops. The eddy current can be perpendicular to a plane of the magnetic field. The eddy current can be created upon moving a conductor through a magnetic field and due to this a change can be experienced in intensity or direction of the magnetic field that may produce eddy current.

Figure 3:
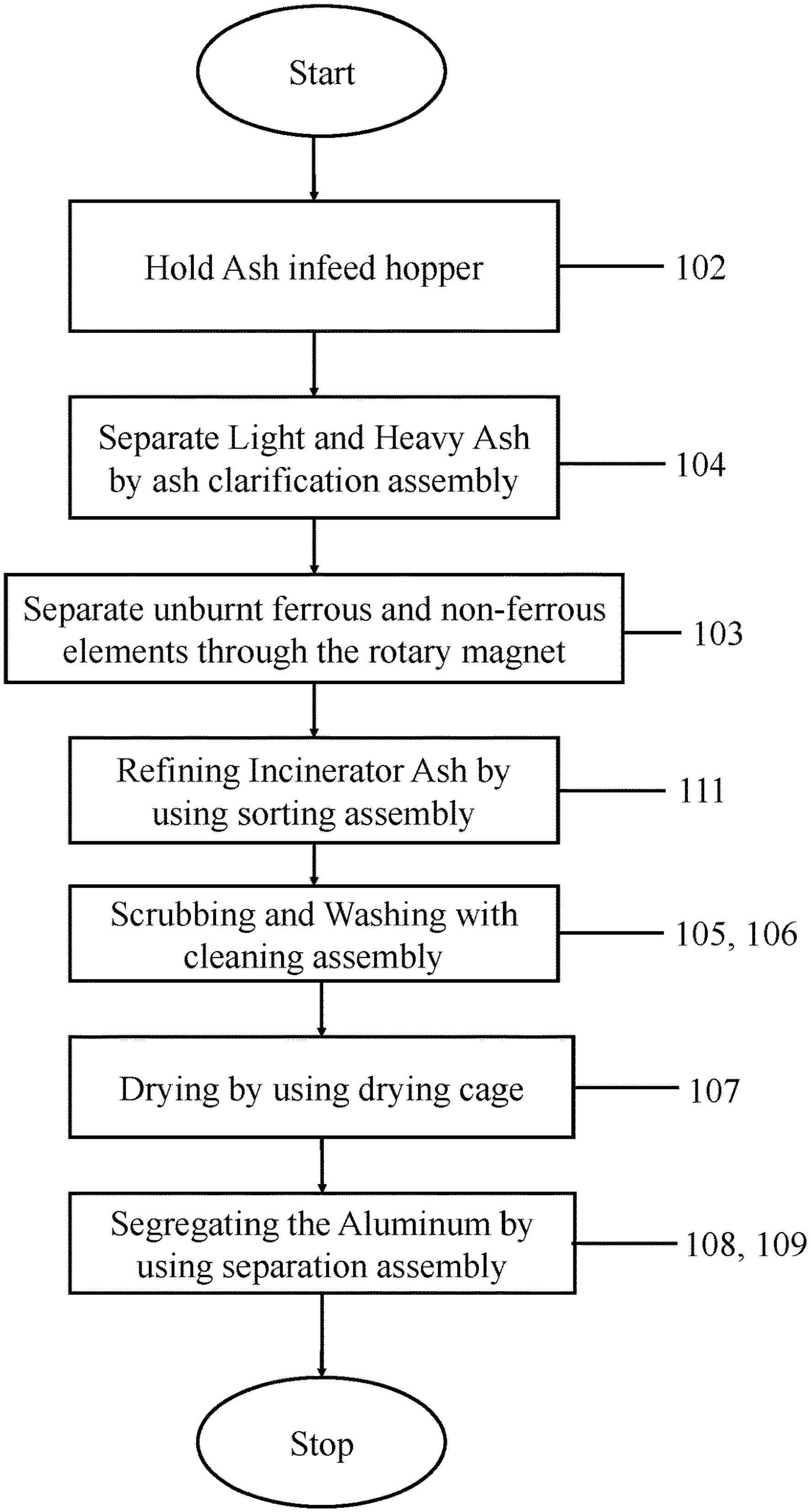
FIG. 3 is a block diagram of the system for recovering metal from incinerator ash.

Referring to FIG. 3, the method for aforementioned system 100 comprising the steps of, the first step can be to hold the incinerator ash through the infeed hopper 102. Basically, the infeed hopper 102 holds the mixture of fly ash and bottom ash. The mixture in the infeed hopper 102 can be transferred to the ash clarification assembly 104 by the help of the conveyer belt.

After entering in the ash clarification assembly 104, the heavy and light ash can be separated. The ash clarification assembly 104 separates the light and heavy ash by using the Archimedes principle. According to Archimedes principle when a body can be partially or completely immersed in a fluid, it experiences an apparent loss in weight that is equal to the weight of the fluid displaced by the immersed part of the body, due to this the heavy ash settle down in the bottom and light ash starts floating.

The incinerator ash can than come in contact with rotary magnet 103. The rotary magnet 103 separates un-burn ferrous and non-ferrous elements. The separation of the ferrous and non ferrous elements is done by the rotary magnet 103 in such a way that the ferrous elements may stick to the rotary magnet 103 and the non-ferrous element may fall down.

After that the ferrous and non-ferrous elements transfer to the sorting assembly 111. The sorting assembly 111 performs refining process on both the elements. The elements after going through the refining process moves to the cleaning assembly 105, 106. The elements are scrubbed and washed in the cleaning assembly 105, 106.

The cleaning assembly 105, 106 makes the elements wet so the elements further transfer to the drying cage 107 to remove the water droplets from the elements by generating heat and at last the elements enters into the separation assembly 108, 109 for segregating of the ferrous and non-ferrous elements.

Figure 4:
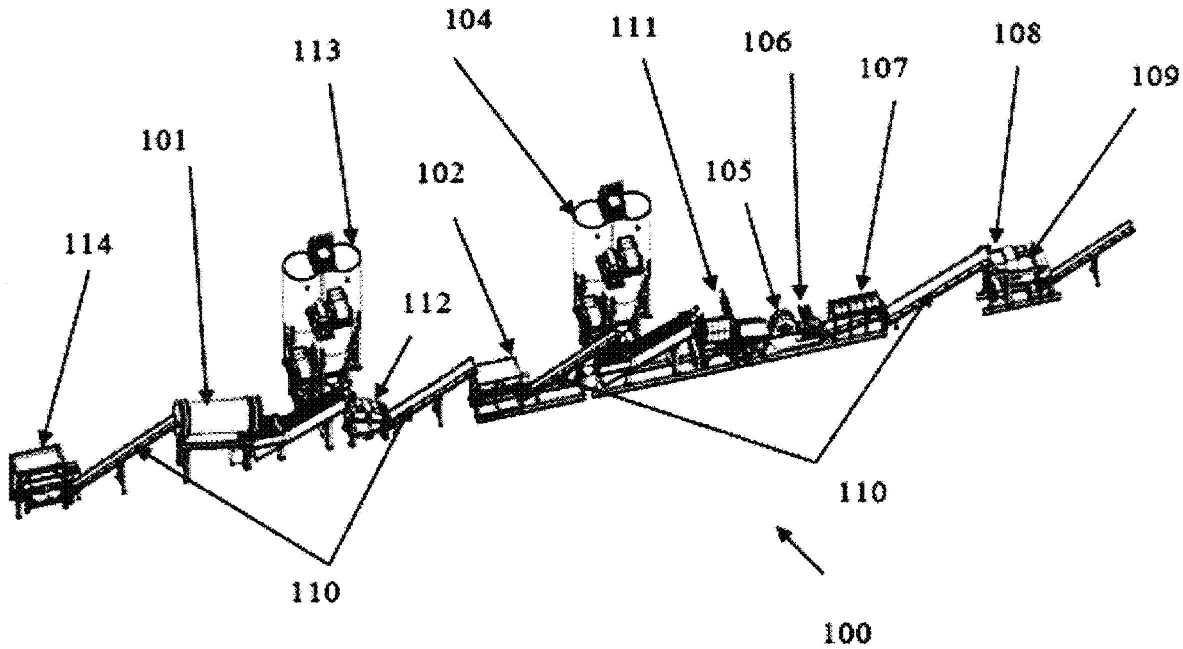
FIG. 4 is a block diagram of the method for recovering metal from incinerator ash.

Referring to FIG. 4, according to another embodiment, a fly ash processor can be connected to the infeed hopper 114 to add the incinerator ash. The fly ash processor extracts the ferrous and nonferrous elements from light weighted ash. The fly ash processor consists of another infeed hopper 114 for holding the ash. The incinerator ash transfer from the infeed hopper 114 to an agglomeration drum 101. The agglomeration drum 101 can be associated with the infeed hopper 114 of fly ash processor for loosening the incinerator ash. After loosening of the incinerator ash, sorting of organic material can be done of the incinerator ash. Another ash clarification assembly 113 can be associated with the infeed hopper 114 of the fly ash processor to separate heavy and light particles from the incinerator ash. The separated light and heavy ash particles move forward for further process.

The invention overcomes the problem of wastage of metals in the burned ash, as it recovers 90% of the ferrous and nonferrous elements from the ash.

In one embodiment, the materials or sand may be sent to de-watering and drying at a dryer. For example, drying may take place via the use of a machine/apparatus, or drying may occur through natural means. In one example, the dryer or dewatering reduce the water moisture in the sand to less than 15% or 14% or other reasonable percent suitable for aluminum separation—the percentage of moisture may be more suitable for an eddy current or other aluminum separator.

Certain embodiments can be useful in recovering high value recyclables that are present in very low concentrations in incinerator ash, including processed combined ash and bottom ash. In one embodiment, the incinerator ash may include at least one type of recoverable metal or material at a concentration less than 10%, less than 4% or 5%, or even less than 1%, and the system or method can be used to recover at least 50%, at least 70%, at least 80%, or at least 90% of the particular recoverable material or metal. The aggregate or product may be essentially metal and/or glass free (e.g., less than 1% or less than 0.01% metal or glass free). The sand can be greater than 200 mesh.

In one embodiment, the sorters and parts of the system and method may be constructed as an in-line system. The order of the elements or equipment can be varied according to desired parameters.

In one embodiment, the system and methods can be employed on site at or near an incinerator. In this arrangement, the bottom ash may be extracted from the incinerator and treated using the processes or the systems herein.

\In one embodiment, the system and method can be a closed-loop method or system. The water can be recycled/reused through the system through the use of, e.g., clarifiers. An exemplary water arrangement in shown in FIGS. 1 and 4. Other arrangements are suitable as well.

As can be seen, the terms "heavier" and "lighter" refer to relatively greater and lesser specific gravity, respectively. Within the separation, absolute weight can be less important than buoyancy in the fluid.

The term "metal" as used herein, refers to a solid material that is hard, shiny, malleable, fusible, and ductile with good electrical and thermal conductivity that is able to be recovered and removed from a stream. Metals can include iron, gold, silver, copper, aluminum, lead, arsenic, barium, cadmium, chromium, mercury, selenium, nickel, thallium, antimony, beryllium, or alloys (brass, steel). Any combination of metal particles can be removed. The metal particles removed can also be heavy metal particles.

Although specific embodiments of the disclosure have been described above in detail, the description is merely for purposes of illustration. It should be appreciated, therefore, that many aspects of the disclosure were described above by way of example only and are not intended as required or essential elements of the disclosure unless explicitly stated otherwise. Various modifications of, and equivalent steps corresponding to, the disclosed aspects of the exemplary embodiments, in addition to those described above, can be made by a person of ordinary skill in the art, having the benefit of this disclosure, without departing from the spirit and scope of the invention defined in the following claims, the scope of which is to be accorded the broadest interpretation so as to encompass such modifications and equivalent structures.

What is claimed is:

1. A system for recovering of metal and sand from incinerator ash material, comprising;

an infeed hopper to hold the incinerator ash;

an ash clarification assembly in connection with infeed hopper for separating light ash and heavy ash, wherein the ash clarification assembly separates materials by specific gravity and separates the light ash and the heavy ash; and the light ash contains unburnt organics;

a magnet to remove the ferrous from the heavy material;

a sorting assembly to remove heavy metals from the material;

a drying cage or dewatering screen to dry the material; and a separation assembly to remove the aluminum from the material, which leaves remaining material, wherein the remaining material is sand and a cleaning assembly consists of a sand scrubber and a washing jet for removing sand from the elements.

2. The system of claim 1, wherein the ash clarification system separates material at specific gravity between 1.0 and 1.2.

3. The system of claim 1, wherein the ash clarification system is a jig, a sand screw, a sink-float separator, and an airtable separator, or a rising current separator.

4. The system as claimed in claim 1, wherein plurality of conveyer belts being used for moving said incinerator ash in said system.

5. The system of claim 1, wherein the sorting assembly separates material at specific gravity between 1.6 and 1.8.

6. The system as claimed in claim 1, wherein said incinerator ash is mixture of bottom ash and fly ash.

7. The system as claimed in claim 1, wherein a sieve screen aperture interconnected to a rotary magnet and a conveyor for removing minute particles from said incinerator ash.

8. The system as claimed in claim 1, wherein plurality of containers placed underneath of a rotary magnet and separation assembly to collect said ferrous and nonferrous elements.

9. The system of claim 1, wherein the separation assembly is an eddy current chamber.

10. The system of claim 1, wherein the separation assembly is an electrostatic separator or ball mill or a rod mill.

* * * * *